United States Patent [19]

Davis et al.

[11] Patent Number: 4,972,868

[45] Date of Patent: Nov. 27, 1990

[54] FLOW RESTRICTOR AND DIVERTER FOR DIRECT ACTING PRESSURE REGULATOR

[75] Inventors: David B. Davis, Whitewright; David E. Woollums, Allen; Donald D. Rice, Wylie, all of Tex.

[73] Assignee: Fisher Controls International, Inc., Clayton, Mo.

[21] Appl. No.: 477,234

[22] Filed: Feb. 8, 1990

[51] Int. Cl.⁵ ............................................. G05D 16/06
[52] U.S. Cl. ............................. 137/116.5; 137/505.46; 137/505.47; 251/118
[58] Field of Search ...................... 137/505.46, 505.47, 137/116.5; 251/127, 118

[56] References Cited

U.S. PATENT DOCUMENTS

| | | | |
|---|---|---|---|
| 1,893,254 | 1/1933 | Sweeney | 137/505.46 X |
| 1,934,832 | 11/1933 | Temple | 137/505.47 X |
| 2,263,011 | 11/1941 | Carnes | 137/505.46 X |
| 2,967,536 | 1/1961 | Stratman | 137/484.8 X |
| 3,086,548 | 4/1963 | Galiger et al. | 137/484.8 |
| 3,207,175 | 9/1965 | Pauly | 137/484.6 |
| 3,633,611 | 1/1972 | MacNeil | 137/118 X |
| 4,842,013 | 6/1989 | Rice et al. | 137/505.40 X |
| 4,889,158 | 12/1989 | Rice et al. | 137/505.46 X |

*Primary Examiner*—Alan Cohan
*Attorney, Agent, or Firm*—Nicholas A. Camasto; Dale A. Kubly; Arnold H. Cole

[57] ABSTRACT

A metallic gas pressure regulator includes a spring casing and a lower casing, sandwiching a diaphragm. The lower casing has axially aligned inlet and outlet ports. A one piece plastic cam stem and relief seat is mounted for movement with the diaphragm and includes a cam surface engaging a movable plastic disk holder. The disk holder is movable within a plastic orifice tube that supports a plastic valve seat. The orifice tube has a removable plastic boost end cap for providing a boost action to the diaphragm. A pressure relief mechanism is incorporated within the upper portion of the diaphragm. A metal disk is affixed in the inlet and includes a flow restricting hole and a flow diverter for directing flow toward the pressure relief mechanism in the event of destruction of the plastic orifice tube.

9 Claims, 6 Drawing Sheets

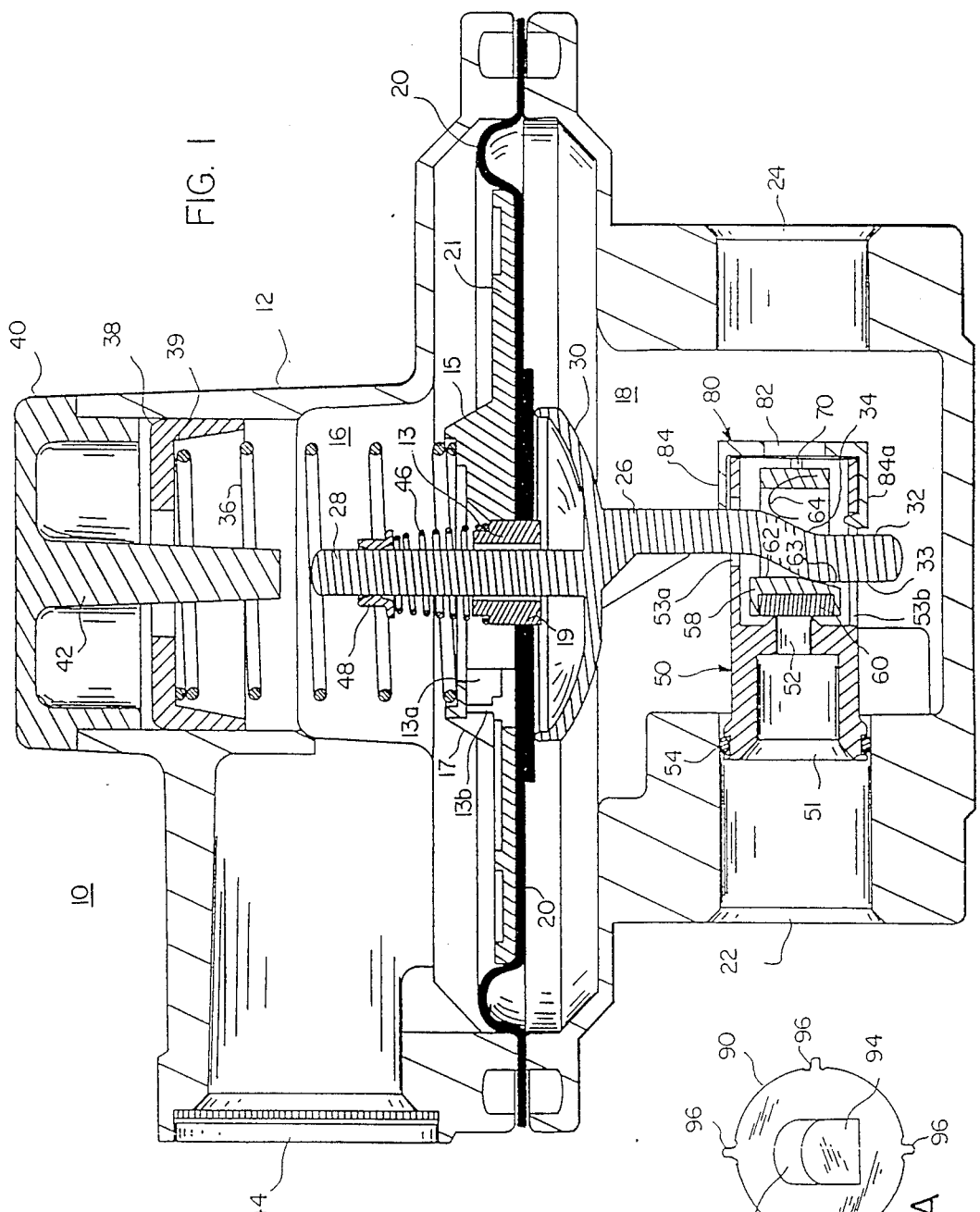

FLOW RESTRICTOR AND DIVERTER FOR DIRECT ACTING PRESSURE REGULATOR

This application is related to application Ser. No. 07/352,049, filed May 15, 1989, entitled "Boost Modified, Droop Compensated Direct Acting Pressure Regulator," in the names of D. D. Rice and M. E. Hood and assigned to Fisher Controls International, Inc.

BACKGROUND OF THE INVENTION AND PRIOR ART

This invention relates generally to gas pressure diaphragm regulator valves and particularly to a gas pressure regulator valve for natural gas or liquified petroleum gas (LP or propane) service that is both inexpensive and safe.

Gas pressure diaphragm type regulator valves are well-known in the art. In such valves, a valve disk and a mating seat assembly are positioned intermediate to an upstream and a downstream portion of a flowpath for controlling downstream pressure and gas flow by varying the valve opening, that is, the amount by which the valve disk is displaced from its associated valve seat. Gas pressure and flow regulation are achieved by modulating the valve opening to maintain the required downstream pressure while delivering the quantity of gas demanded by the load. The popular, low cost, single stage regulator valve includes a diaphragm that acts as both the measuring and the actuation device with the downstream pressure being applied to one side of the diaphragm against the force of an opposed, adjustable regulator spring. The spring force initially holds the diaphragm and the attached stem linkage mechanism in such a position so as to have retracted the valve disk from the valve seat. As upstream pressure is introduced, gas flow occurs over the seat to the disk opening and into the downstream side of the device. The downstream pressure force is applied against the diaphragm and enables the diaphragm to overcome the opposing regulator spring force, thereby moving the stem linkage and the valve disk to a position closer to the valve seat. In this manner, the adjustment of the regulator spring loading determines the downstream control pressure as a force equilibrium is achieved between the loading force of the spring and the force on the diaphragm from the downstream pressure. The linkage mechanism provides a mechanical advantage which enables a small diaphragm, actuated by very low downstream control pressures, to close the valve disk against the valve seat despite the relatively high pressure acting to push the disk open.

All single stage regulator valves experience so-called "droop" in their pressure flow characteristic. Droop is caused by two factors, one being the small change in the force exerted by the regulating spring due to changes in its length during travel of the diaphragm, and the other because the effective area of the diaphragm changes slightly as the diaphragm moves. These effects combine to lower the downstream control pressure with flow increases. Hence the pressure is said to "droop." A relatively simple, inexpensive and effective partial solution is to use "velocity boosting" to apply a slightly lower pressure than the controlled downstream pressure to the diaphragm. The effect is to cause a larger valve opening and greater gas flow rates. Velocity boosting can be accomplished by a pilot tube that is positioned to sense the lower pressure at the vena contracta of the valve or by a boost tube to develop a lower pressure with increased velocity of flow in the valve chamber that communicates with the diaphragm. Other techniques for aspirating the chamber to reduce the effective pressure below that of the controlled downstream pressure are also contemplated.

It will be appreciated that in domestic gas service, the downstream pressure must be maintained at an extremely low level, on the order of 7 to 11 inches (approximately 18 to 28 centimeters) of water column pressure for natural gas and LP gas service, respectively, whereas the inlet or upstream pressure may be on the order of 60 psi (4.22 Kg per square centimeter) or more. Good pressure relief operation is required to preclude potentially serious over pressure conditions in the downstream system as well as to minimize annoying (and potentially dangerous) extinguishing of pilot lights in domestic appliances. However, the demands on gas pressure regulators, for domestic use in particular, are such that design compromises are required in the simple mechanical devices. For example, friction and hysteresis or backlash, inherent in linkage mechanisms, detract from the consistency of regulator performance. As mentioned, the spring effect and the diaphragm effect combine to cause output pressure droop. This droop will be overcome only at certain inlet pressures or across limited flow ranges by imprecise velocity boosting techniques. The fixed mechanical advantage linkage mechanisms do nothing to overcome droop. In many current examples of the art, the relief valve is contained in an actuator housing which is separated from the body that houses the valve seat, forcing overpressured downstream gas to flow through restricting passages before reaching the relief valve for venting.

The gas pressure regulator valve of the above-mentioned copending application overcomes these limitations by utilizing a combination of a characterized cam stem and an orifice tube which is a valve seat with an integral boost tube. The characterized or contoured cam stem has a cam profile that is directly operable by the regulator spring and diaphragm for moving a valve disk in a straight line into and out of engagement with a valve seat in a nonlinear fashion, without the intervention of any linkage mechanism. The cam stem provides a high mechanical advantage when required to close the valve disk against the seat, yet exhibits a low mechanical advantage to achieve rapid, nonlinear opening of the valve disk to mechanically induce a boost effect and maintain the desired downstream control pressure in all flow situations. The orifice tube aids in the uniformity of regulation by inducing flow activated boost as its configuration determines the space between the end of the tube and the valve outlet which in turn controls aspiration of the diaphragm cavity, which is the downstream pressure measuring element of the regulator. The arrangement also permits the diaphragm to be exposed to a large volume flow chamber, and in conjunction with a large area relief seat on the cam stem, provides excellent over pressure protection or relief performance. The direct acting pressure regulator valve is thus suitable for either natural gas or LP gas service use by simply changing the predetermined, adjustable relief valve spring and regulator spring loads.

A removable boost end cap is provided for the orifice tube. The boost end cap has an orifice that is significantly smaller in diameter than the diameter of the orifice tube and significantly larger in diameter than the diameter of the valve seat, thus providing a design controlled boost effect. The boost end caps are manufactured with different size orifices for use with orifice tubes with corresponding size valve seats to enable a common valve design to have individual operating characteristics tailored to different environmental conditions. The valve also includes a unique valve disk holder for rectilinear movement in the orifice tube. To facilitate minimum operating friction, parts that move against each other are manufactured of plastic materials of differing characteristics.

In the valve of the copending application, the orifice tube, valve seat, valve disk holder, boost end cap and characterized cam stem are all made of various types of plastic materials. In some uses it is desirable to guard against the exigencies of fire and extreme heat which could produce a catastrophic failure (destruction) of the plastic parts and expose the downstream valve outlet to upstream inlet pressure and flow. The metallic flow restrictor and diverter of the present invention precludes the ill effects of such catastrophic failure. The restrictor restricts the flow volume (determined by the orifice) in the restrictor and diverter disk and a deflector portion directs the flow toward the pressure relief mechanism and away from the outlet of the valve.

OBJECTS OF THE INVENTION

A principal object of the invention is to provide a novel gas pressure regulator valve.

Another object of the invention is to provide a low cost, fire and heat protected, high performance, direct acting, single stage gas pressure regulator valve suitable for a wide range of applications.

A further object of the invention is to provide an improved low cost single stage gas pressure regulator valve with flow restriction and diversion protection.

BRIEF DESCRIPTION OF THE DRAWINGS

These and other objects and advantages of the invention will be apparent upon reading the following description in conjunction with the drawings, in which:

FIG. 1 is a cross section of a regulator valve constructed in accordance with the invention;

FIG. 1A is an elevation view of the flow restrictor and diverter of the invention;

DESCRIPTION OF THE PREFERRED EMBODIMENT

Figure 2:
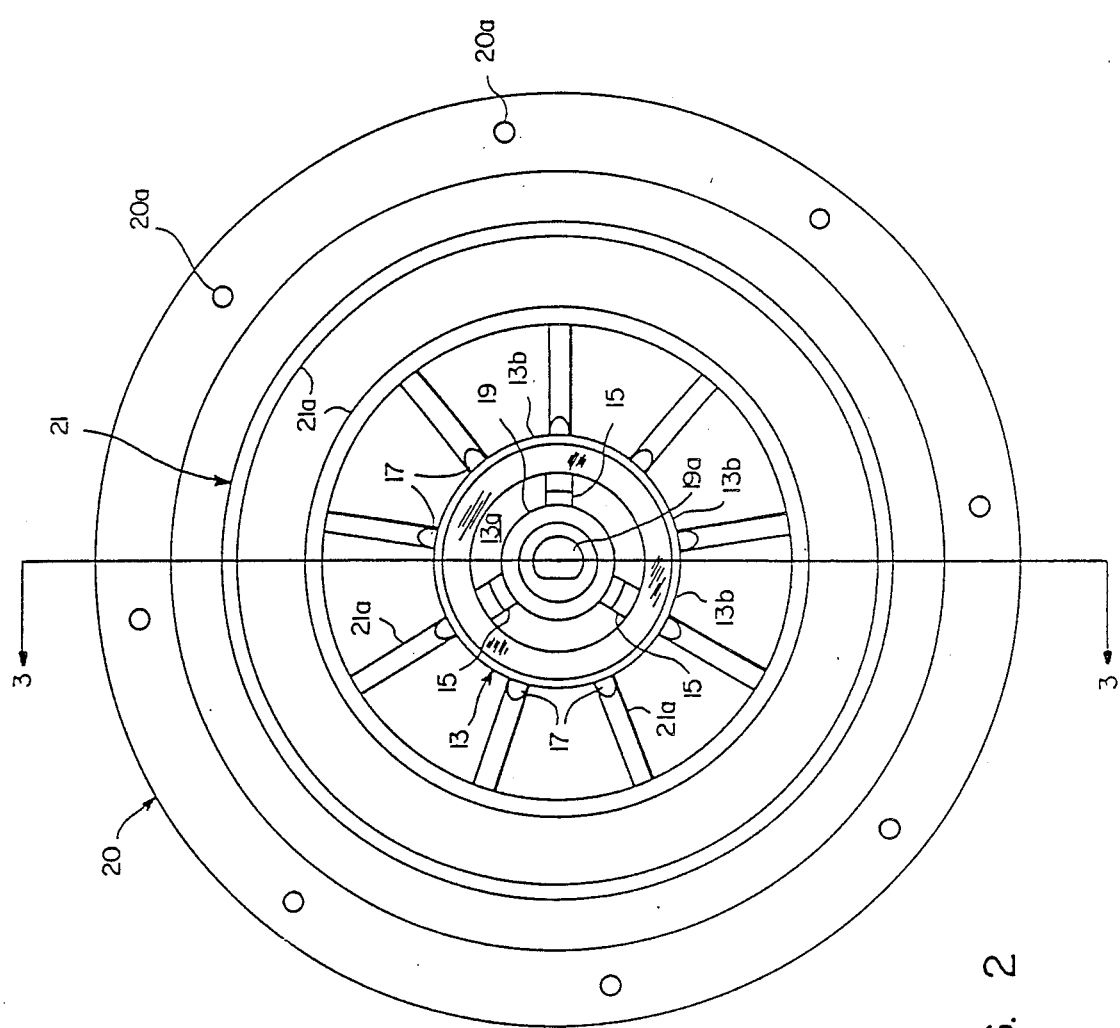
FIG. 2 is a plan view of the diaphragm assembly of the valve of FIG. 1.
Figure 7:
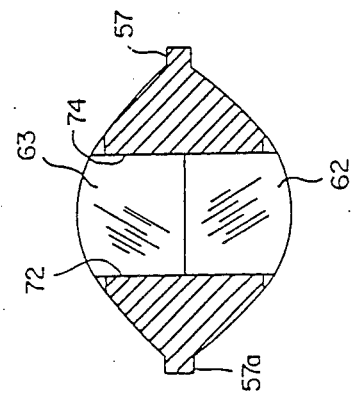
FIG. 7 is a partial view taken along line 7—7 in FIG. 4.

Referring to FIG. 1, a regulator valve 10 includes a spring casing 12 that is assembled onto a regulator valve body or lower casing 14 by any conventional means. For example, the casings may include mating flanges along their peripheries that are secured together by suitable threaded fasteners and mating threaded apertures. These details are not illustrated. Spring casing 12 defines an upper chamber 16 and valve body 14 defines a lower chamber 18 of large volume. Separating these two chambers is an elastomeric, generally annular diaphragm 20 that is affixed to a large diameter diaphragm head 21. The circular, outer periphery of diaphragm 20 is captivated between the flanges of spring casing 12 and valve body 14. The inner portion of diaphragm 20 is secured to diaphragm head 21 by gluing or the like. Diaphragm head 21 has a centrally disposed, upstanding cylindrical collar 19. As will be appreciated by those skilled in the art, diaphragm head 21 is not solid, but defines a raised crown 13 having a plurality of large apertures 13a (only one of which is partially visible in this Figure) that in normal operation are sealed off from lower chamber 18 by a large area, generally cup-shaped, relief seat 30 that is an integral part of a cam stem 26. The raised crown 13 has three equally spaced major supports 15 and six smaller supports 17 that define a series of apertures 13b. The relief seat may, of course, simply be affixed to cam stem 26. Cam stem 26 includes a cylindrical post 28, with collar 19 of diaphragm head 21 being slidably mounted thereon. As will be seen, cylindrical post 28 has a D-shaped cross section that is matched by a similar shaped orifice 19a in collar 19 (FIG. 2). Pressure is applied to seal the underside of diaphragm 20 with relief seat 30 by a relief spring 46 that is captivated between collar 19 of diaphragm head 21 and a securing means 48. Securing means 48 may comprise an adjustment nut that threadingly engages a threaded end of post 28. In the preferred embodiment, securing means 48 comprises an annular metallic collar, with a circular opening matching that of post 28, that is crimped into place on the upper portion of cylindrical post 28 after relief spring 46 is preloaded to its desired pressure. This construction technique eliminates a number of manufacturing tolerances and enhances the uniformity of product performance. Relief spring 46 is loaded such that, for normal operating pressures, diaphragm head 21 does not move relative to cam stem 26 and consequently relief seat 30 remains in engagement with the underside of diaphragm 20.

When the diaphragm and relief seat are engaged, there is no flow path from valve body 14 to spring casing 12. When an over pressure condition exists such that diaphragm head 21 is driven upward with respect to cam stem 26, the seal between diaphragm 20 and relief seat 30 is broken and gas flow occurs from lower chamber 18 around relief seat 30 and through orifices 13a and 13b in the raised crown 13 of diaphragm head 21, to upper chamber 16. The raised crown design enables rapid flow of escaping gas through orifices 13b in the sides of raised crown 13 in addition to the flow through orifices 13a in its top, which latter flow is somewhat impeded by the regulator spring 36. In short, relief performance is aided by the raised crown design.

The upper portion of spring casing 12 is closed by a closing cap 40. An adjustable regulator spring 36 is captivated between diaphragm head 21 and an upper spring seat 39 formed in the bottom of a vertically displaceable adjustment screw 38 that may be turned for increasing or decreasing the force exerted by regulator spring 36 on the diaphragm head. Cap 40 includes a downwardly projecting travel stop 42 to limit the upward movement of cam stem 26 and force the regulator into relief operation in the event of catastrophic failure of the valve mechanism both to close in response to a cessation of gas demand and also to fail to relieve the resulting over pressure through normal relief operation. Spring casing 12 also defines a relief vent 44 by means of which upper chamber 16 communicates with the external environment.

Regulator valve body 14 includes an inlet port 22 and an outlet port 24 that are threadingly engageable for connection of the regulator valve in a pipeline (not shown) in which gas flows. Inlet port 22 and outlet port 24 are preferably axially aligned as shown to provide a relatively straight through flowpath for the gas in the pipeline. Cam stem 26 terminates in a stem end 32 having a front cam profile or surface 33 and a similarly contoured rear cam profile or surface 34. Stem end 32 extends through generally rectangular openings 53a and 53b in a cylindrical orifice tube 50 having a length that extends over a substantial portion of the distance between inlet port 22 and outlet port 4. Orifice tube 50 is secured in valve body 14 and forms a gas tight seal with the inner wall of inlet port 22 by means of an 0 ring 54 and has a tapered portion 51 providing an entranceway thereto and forming a circular valve seat 52. Orifice tube 50 also has a boost end cap 80 for providing a velocity boosting effect to gas flow therethrough to produce, by aspiration of the chamber by the flow velocity, a slightly lower pressure on the underside of diaphragm 20 than exists at outlet port 24. A valve disk 60 is carried by a disk holder 58 that is horizontally movable within orifice tube 50 in response to vertical movement of cam stem 26 at right angles thereto. This is accomplished by cam follower surfaces 62 and 63 on disk holder 58 that are engageable with front cam surface 33 on stem end 32. As will be seen with reference to the other figures, disk holder 58 is confined to straight line axial movement within orifice tube 50 by means of a pair of grooves in the orifice tube, one of which (70) is partially visible in FIG. 1. A bias spring 64 engages rear cam surface 34 of stem end 32 and serves to compensate for hysteresis effects in valve operation. Boost end cap 80 is removably secured to the end of orifice tube 50 by a plurality of fingers 84 and 84a, as will be explained. An orifice 82 is provided in the back of boost end cap 80 for modifying the boost effects by aspiration of lower chamber 18.

It should be noted that the underside of diaphragm 20 is substantially in direct communication with the flowpath that exists between inlet port 22 and outlet port 24. This arrangement, in conjunction with a large relief seat 30 on cam stem 26, enables fast, effective high pressure relief operation in the event of a sudden increase in outlet or downstream pressure, as described above. It should also be noted that the vertical movement of cam stem 26 is directly translated into straight line horizontal movement of valve disk 60 with respect to valve seat 52. There is no linkage mechanism, i.e., levers or pivots, to impose frictional losses or introduce mechanical play. Thus with the construction of the inventive arrangement, tight control over outlet pressure and flow, with excellent pressure relief, is achievable in a simple, low cost, direct operated regulator. In accordance with the present invention, a flow restrictor and diverter disk 90 is incorporated in the inlet 22.

The valve described includes plastic elements as well as metallic elements. The spring casing 12 and lower casing 14, for example, are made of metal. On the other hand, the orifice tube 50, cam stem 26 and relief seat 30, diaphragm head 21, disk holder 58 and valve seat 52 are made of different types of engineered resins (plastics) which may experience catastrophic failure and destruction in the presence of flame or intense heat. Under particularly adverse conditions, the outlet of the valve could be exposed to full inlet pressure and flow restricted only by the area of the inlet. To guard against that remote possibility, metallic restrictor and diverter disk 90 is affixed in inlet 22 in front of orifice tube 50.

As seen in FIG. 1A, disk 90 is generally circular and includes an orifice 92 formed by cutting and bending a deflector portion 94, at about a forty-five degree angle to the plane of disk 90. A plurality (four) deformable tabs or extensions 96 extend beyond the circular periphery of disk 90. The diameter of disk 90 is approximately equal to the diameter of inlet 22 and tabs 96 are deformed as disk 90 is forced into position in the inlet 22. This secures disk 90 in inlet 22, which, as part of the lower casing is metallic. Deflector 94 is oriented as shown in FIG. 1 such that, in the absence of orifice tube 50, flow is directed toward the underside of diaphragm 20 and relief seat 30. In particular, flow is diverted away from the outlet 24. Further, the flow is restricted by the area of orifice 92.

Figure 3:
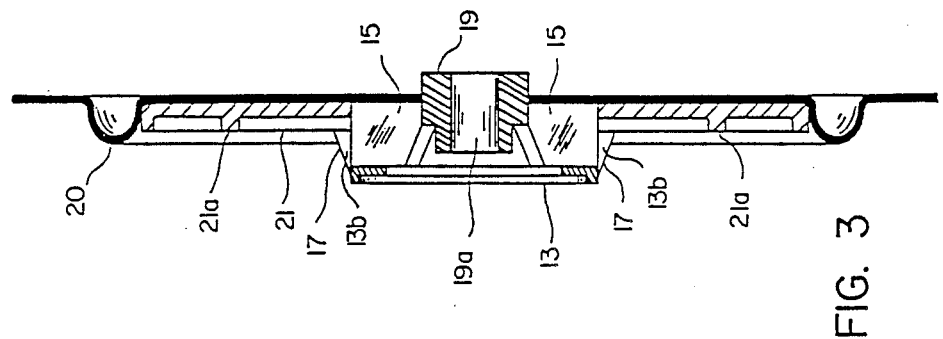
FIG. 3 is a sectional view taken along line 3—3 of FIG. 2.

In FIGS. 2 and 3, the diaphragm 20 and diaphragm head 21 are shown in plan view and in cross sectional view. In particular, the orifices 13a and 13b in raised crown 13 are more clearly visible. The molded diaphragm head includes a plurality of raised surfaces 21a for strengthening purposes. Diaphragm 20 includes a plurality of equally spaced holes 20a for facilitating mounting of the diaphragm between the upper and lower casings of the valve. The D-shaped aperture 19a in collar 19 cooperates with the similar D-shaped cross section of cylindrical post 28 on the upper part of stem 26 for providing orientation between cam stem 26 and the bolt hole circle of the valve for ease of assembly.

Reference to FIGS. 4–10 will reveal further construction details of the valve. In the enlarged view of FIG. 4, the cutaway of disk holder 58 clearly shows valve disk 60, which is preferably constructed of a resilient material such as synthetic rubber, and maintained in a suitable recess in the forward end of disk holder 58. Disk holder 58 has a cylindrical forward portion and a generally flattened diamond shaped body with a cutout portion defining a pair of inner parallel side walls 72 and 74, a rear wall 76 and a forward wall defined by cam follower surfaces 62 and 63. Rear wall 76 has bias spring 64 secured therein by ultrasonic welding or the like. Bias spring 64 resiliently engages the rear cam profile 34 on stem end 32 of cam stem 26. Disk holder 58 has a pair of parallel extensions or wings 57 and 57a that cooperate with a pair of diametrically opposed parallel slots 68 and 70 in the inner surface of orifice tube 50 to confine disk holder 58 to straight line axial movement within the orifice tube. First and second mounting ears 55 are formed at the forward end of orifice tube 50 and include mounting apertures 55a for mounting the orifice tube securely within lower casing 14 of the regulator valve. An enlarged portion 65 on the rear of orifice tube 50 has an annular groove 67 formed therein for cooperating with finger 84 and 84a to secure boost end cap 80 in position.

As shown, cam follower surfaces 62 and 63 are flat and angled with respect to each other. The cam follower surfaces cooperate with front cam profile 33 on cam stem 26 to move disk holder 58 and thereby control the flow opening between valve seat 52 and valve disk 60. The contour of cam profile 33 and the cam follower surfaces 62 and 63 provide approximately a 4:1 force advantage to facilitate firm closure of the valve disk when necessary, which tapers to approximately a 2:1 mechanical advantage to facilitate regulation stability and capacity during flow conditions.

Figure 10:
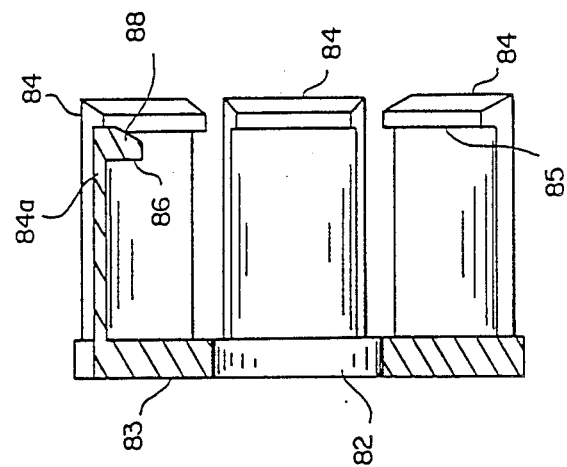
FIG. 10 is a sectional view taken along line 10—10 of FIG. 9.
Figure 9:
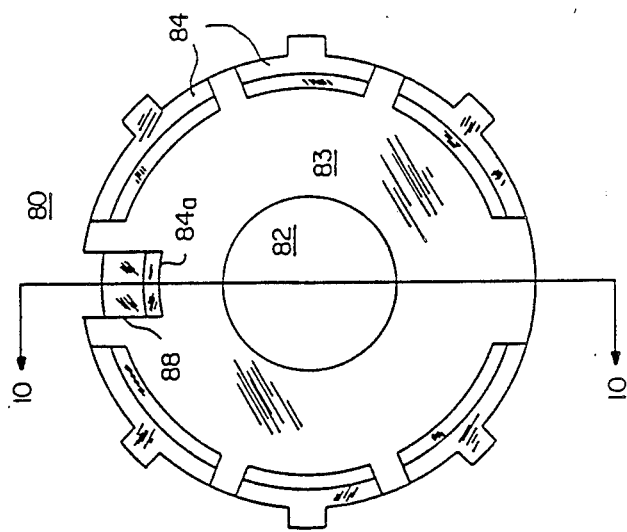
FIG. 9 is a front elevation of the boost end cap of the invention.

Referring to FIGS. 9 and 10 specifically, an end boost cap 80 is shown in plan view in FIG. 9 and in sectional view in FIG. 10. End cap 80 is generally cup-shaped and includes a plurality of fingers 84 terminating in latch portions 85 extending circumferentially about a base 83 having hole 82 disposed therein. The rectangular ribs extending along the outer surface of fingers 84 are for stiffening purposes. Another finger 84a is inset from the outer diameter of boost end cap 80 and terminates in a latch portion 86 that is inwardly displaced from latch portions 85 of the fingers 84. The front or forward surface of latch portion 86 forms a surface 88 that in operation bears against the rear surface of the lower portion of cam stem 26. This is more clearly seen in FIG. 4 where finger 84a is shown in place with latch portion 86 engaging the rear wall of rectangular opening 53b in orifice tube 50. The latch portions 85 are adapted to engage annular groove 67 in the rear of the body of orifice tube 50 (best seen in FIG. 5).

Figure 8:
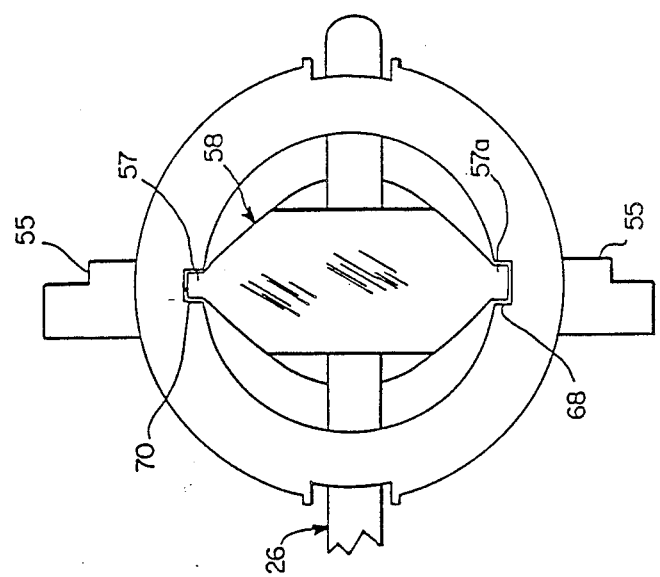
FIG. 8 is an elevation view of the structure of FIG. 5 with the boost end cap removed.
Figure 5:
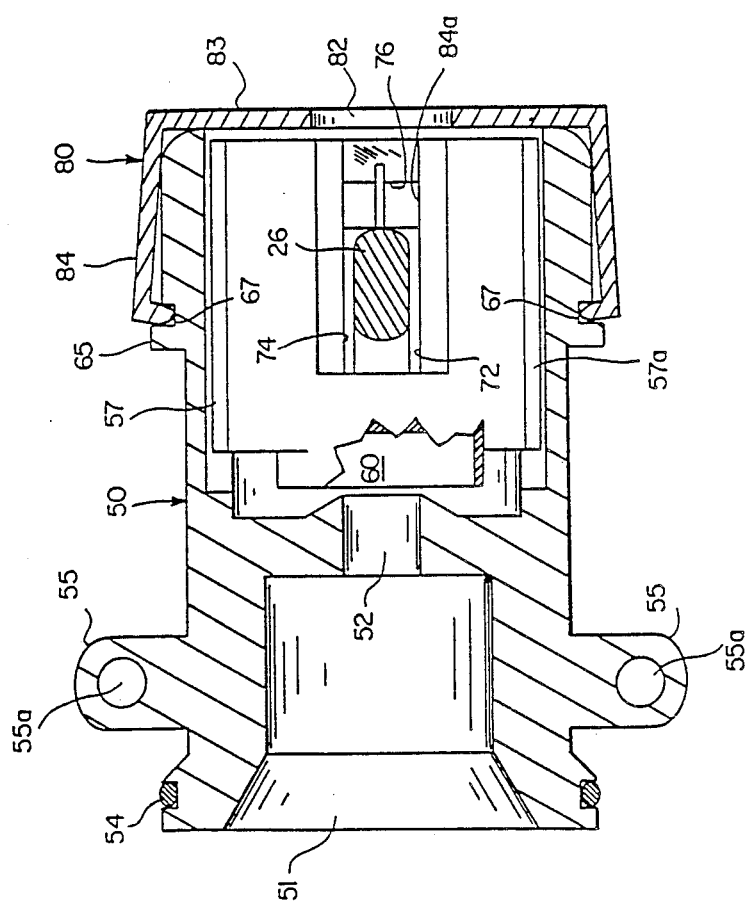
FIG. 5 is a top view of the arrangement of FIG. 4.
Figure 6:
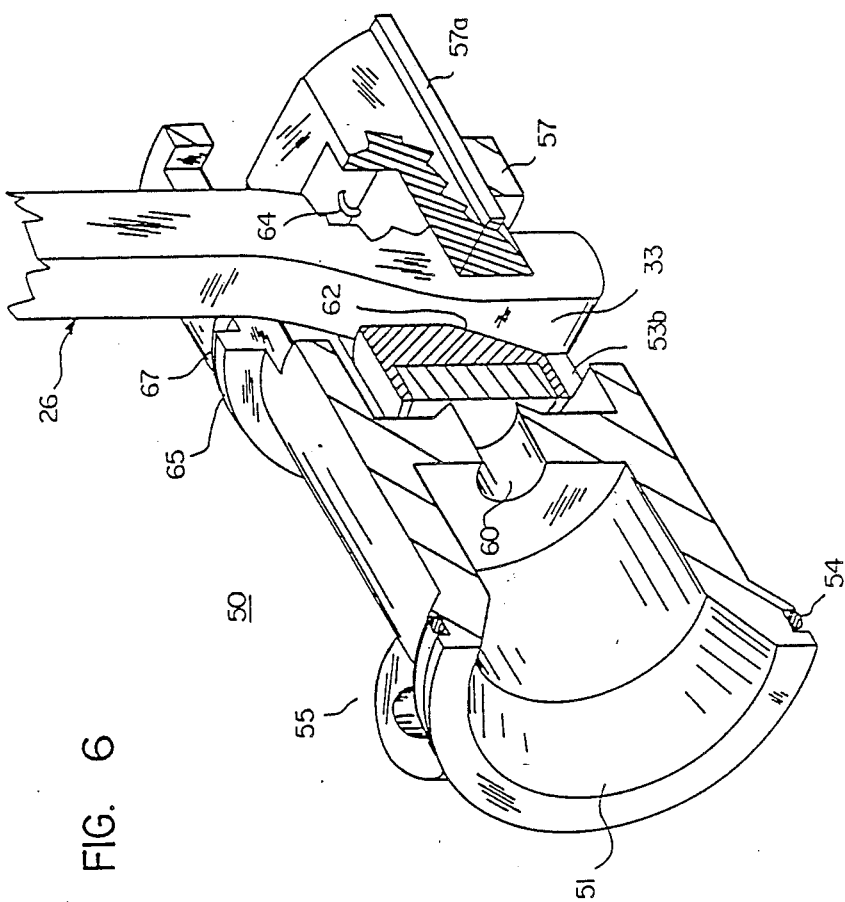
FIG. 6 is a partially cutaway perspective view of the arrangement of FIGS. 4 and 5.

The end view of FIG. 8 (taken with end cap 80 removed) clearly shows that the parallel wings 57 and 57a of disk holder 58 are of different size so that disk holder 58 fits into orifice tube 50 with the proper orientation. This feature provides for ready assembly of the mechanism but should not be considered in any way a limiting factor of the invention.

Figure 4:
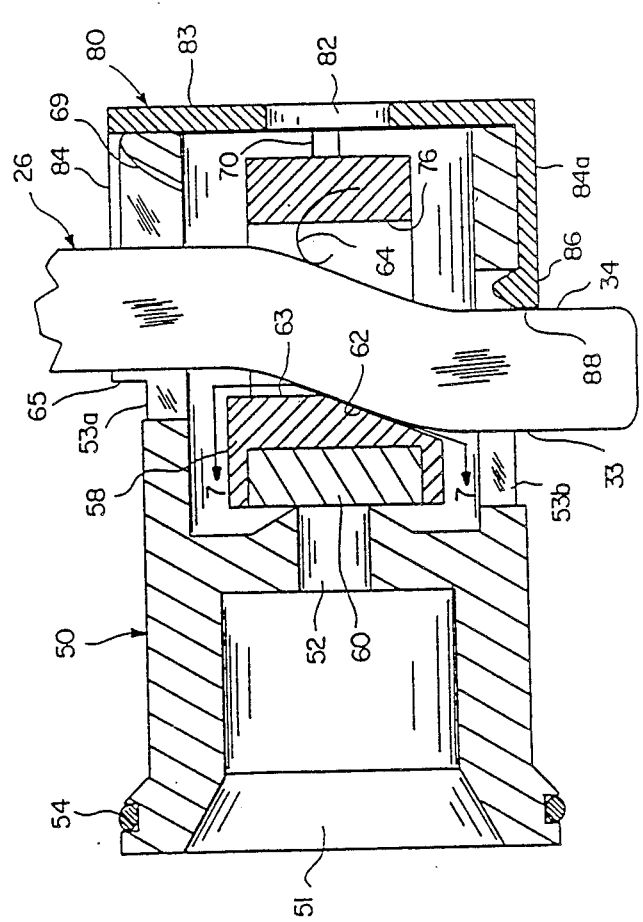
FIG. 4 is an enlarged partial showing of the characterized cam stem, boost tube, end cap and linearly movable disk holder of the inventive regulator valve.

Reverting to FIG. 4, the rear wall 69 of upper slot 53a in orifice tube 50 is inclined. This permits insertion of cam stem 26 into orifice tube 50 with boost end cap 80 in position. Also, as mentioned, surface 88 on latch portion 86 of finger 84a provides a guide for the back side of the lower portion of cam stem 26.

As mentioned, the difficulty with hysteresis or mechanical backlash which results in variations in regulation under both upstream pressure and downstream load changes, is resolved by providing a similarly contoured cam profile 34 on the rear of end 32 of cam stem 26. Bias spring 64 rides along cam profile 34 and continually urges cam surface 33 into engagement with the involved one of cam follower surfaces 62 and 63. This reduces the hysteresis effect and contributes to the very consistent performance of the regulator with load cycling and inlet pressure changes.

The regulator is constructed of lightweight but strong materials in keeping with its cost design objection. As mentioned, the cam stem, orifice tube and disk holder are fabricated of engineering resins of inherently high self-lubricity or the like to provide light weight, strength and low friction. As briefly mentioned, parts that move against each other are constructed of different materials. Thus the valve disk holder 58 is made of nylon, as is the boost end cap 80, to provide bearing surfaces with the orifice tube 50 and cam stem 26, which are made of acetal plastic. Therefore wings 57 and 57a easily ride in grooves 70 and 68 and cam stem 26 readily slides against cam surfaces 62 and 63 of the orifice tube and surface 88 of finger 84a.

The diaphragm may be fabricated from any well-known elastomeric materials utilized for such purposes. The cam stem and relief seat are preferably molded in a single piece. Similarly, the valve seat may be a separate insert or integrally formed as part of the orifice tube. As should be apparent to those skilled in the art, changing the diameter of the orifice in valve seat 52 and the configuration of the cam surfaces as well as altering the size of orifice 82 in boost end cap 80 will enable a manufacturer to provide single stage, low cost gas pressure regulator valves to meet a wide range of environmental and operating conditions. In practice, the size of the valve seat orifice and boost end cap orifice are changed in pairs to meet specific operating characteristics. As is well known, the smaller the orifice in the boost end cap, the more gas is diverted to the lower chamber via rectangular opening 53a and 53b in the orifice tube and the less the boost effect, especially at higher flow rates.

The presence of the restrictor and diverter disk 90 does not appreciably affect normal regulator operation. It is only during a catastrophic failure of the orifice tube that the disk 90 acts to restrict the flow in the valve and divert that flow to the pressure relief mechanism to preclude excessive downstream pressure and flow.

It is recognized that numerous modifications in the described invention will be apparent to those skilled in the art without departing from its true spirit and scope. The invention is to be limited only as defined in the claims.

What is claimed is:

1. A metallic regulator valve having an inlet and an outlet comprising:
   diaphragm means;
   means applying a regulating force to one side of said diaphragm means;
   non-metallic valve means coupled to said inlet and including a valve seat and a movable valve disk means movable into and out of engagement with said valve seat;
   stem means coupled to said diaphragm means and having a cam profile for adjusting the position of said valve disk means with respect to said valve seat responsive to movement of said diaphragm means; and
   metallic flow deflector means positioned in said inlet for restricting flow in said inlet and directing said flow away from said outlet in the event of failure of said valve means.

2. The valve of claim 1 wherein said flow deflector means comprises an annular disk defining a deflector section cut and bent out of the plane of said disk.

3. The valve of claim 2 wherein said annular disk includes deformable tabs for locking engagement with said inlet.

4. A regulator valve comprising:
   a metallic spring casing having a relief vent;
   a lower casing including an inlet and an outlet;
   a spring loaded diaphragm between said spring casing and said lower casing;
   non-metallic valve means in said lower casing positioned between said inlet and said outlet, said non-metallic valve means being subject to physical destruction in the event of fire or excess heat; and
   a metallic flow restrictor and deflector in said inlet for restricting flow in said lower casing and directing flow toward said diaphragm and said relief vent in the event of failure of said non-metallic valve means.

5. A droop compensated gas regulator valve comprising:
   a metallic spring casing and a metallic lower casing;
   a diaphragm interposed between said spring casing and said lower casing;

adjustable spring means in said spring casing for loading one side of said diaphragm;

a stem coupled to said diaphragm and having a a non linear cam profile extending into said lower casing;

an inlet port and an outlet port in said lower casing in axial alignment;

a non-metallic valve seat positioned in said inlet port;

a non-metallic valve disk holder including support means;

a valve disk carried by said valve disk holder;

a non-metallic orifice tube cooperating with said support means on said disk holder for supporting said valve disk holder for straight line movement for moving said valve disk into and out of engagement with said valve seat, said valve disk holder having a cross sectional area that is significantly smaller than the cross sectional area of said orifice tube to enable gas flow thereover;

means for directly coupling said cam profile on said stem to said valve disk holder;

a non-metallic end cap removably attached to the end of said orifice tube, said end cap including an orifice for restricting flow through said orifice tube; and a metallic flow restrictor and diverter secured in said inlet and including a deflector portion for directing flow through said inlet toward said diaphragm in the event of destruction of said non-metallic orifice tube.

6. A droop compensated metallic regulator valve having a tubular inlet and an outlet comprising:

diaphragm means;

means applying a regulating force to one side of said diaphragm means;

a non-metallic valve means coupled to said tubular inlet and including a plastic orifice tube, a plastic valve seat and a movable plastic valve disk means movable into and out of engagement with said valve seat;

plastic stem means coupled to said diaphragm means and having a cam profile for adjusting the position of said valve disk means with respect to said valve seat responsive to movement of said diaphragm means;

said orifice tube supporting said valve seat and including guide means, said movable plastic valve disk means including a plastic valve disk holder having a cam follower surface contacting said cam profile and a valve disk, and said guide means cooperating with said disk holder to restrict movement of said disk holder to straight line movement along the axis of said orifice tube;

pressure relief means in direct flow communication with said plastic orifice tube;

boost means on the end of said plastic orifice tube communicating with said outlet for applying pressure to the other side of said diaphragm means; and bias means for maintaining said cam profile in contact with said cam follower surface;

a removable plastic end cap affixed to said end of said plastic orifice tube, said end cap having an orifice for restricting flow through said orifice tube; and a metallic flow restrictor and diverter disk affixed in said tubular inlet for restricting flow through said tubular inlet and directing flow toward said pressure relief means in the event of destruction of said plastic orifice tube.

7. The valve of claim 6 wherein said disk comprises an annular plate having an aperture and a deflector rigidly secured in said tubular inlet.

8. The valve of claim 6 wherein said disk includes a plurality of deformable tabs for gripping the interior of said tubular inlet.

9. The valve of claim 8 wherein said stem means and said orifice tube are fabricated of one type of material and said valve disk holder and said end cap are fabricated of another type of material to minimize friction forces.

* * * * *

UNITED STATES PATENT AND TRADEMARK OFFICE
CERTIFICATE OF CORRECTION

PATENT NO. : 4,972,868
DATED : November 27, 1990
INVENTOR(S) : David B. Davis, David E. Woollums & Donald D. Rice It is certified that error appears in the above-identified patent and that said Letters Patent is hereby corrected as shown below:

Column 1, line 67, delete "pilot", insert --pitot--.

Signed and Sealed this

Second Day of June, 1992

Attest:

DOUGLAS B. COMER

Attesting Officer

Acting Commissioner of Patents and Trademarks